United States Patent
Woo et al.

(10) Patent No.: US 11,945,112 B2
(45) Date of Patent: Apr. 2, 2024

(54) ROBOTIC PLATFORMS TO MIMIC PAPILLARY MUSCLE MOTION EX VIVO

(71) Applicant: The Board of Trustees of the Leland Stanford Junior University, Stanford, CA (US)

(72) Inventors: Y. Joseph Woo, Menlo Park, CA (US); Michael John Paulsen, Los Altos, CA (US); Annabel M. Imbrie-Moore, Stanford, CA (US); Matthew Park, Piedmont, CA (US); Rohun Kulkarni, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 614 days.

(21) Appl. No.: 17/188,663

(22) Filed: Mar. 1, 2021

(65) Prior Publication Data

US 2021/0268643 A1 Sep. 2, 2021

Related U.S. Application Data

(60) Provisional application No. 62/983,378, filed on Feb. 28, 2020.

(51) Int. Cl.
  *B25J 9/10* (2006.01)
  *B25J 9/12* (2006.01)
  *G09B 23/30* (2006.01)

(52) U.S. Cl.
  CPC .............. *B25J 9/1075* (2013.01); *B25J 9/123* (2013.01); *G09B 23/30* (2013.01)

(58) Field of Classification Search
  CPC ........ B25J 9/1075; B25J 9/123; B25J 9/0051; B25J 9/0084; B25J 11/00; B25J 9/0057; G09B 23/30
  See application file for complete search history.

(56) References Cited

U.S. PATENT DOCUMENTS

| 5,179,525 A | * | 1/1993 | Griffis ................... G09B 9/14 703/1 |
| 9,109,743 B2 | * | 8/2015 | Schwab ................ F16H 21/46 |
| 2022/0372293 A1 | * | 11/2022 | Rajagopalan ........ C08G 77/458 |

FOREIGN PATENT DOCUMENTS

| CA | 2808606 A1 * | 2/2012 | ............. A61H 23/00 |
| KR | 101742585 B1 * | 6/2017 | |

(Continued)

OTHER PUBLICATIONS

Imbrie-Moore et al., "Ex Vivo Biomechanical Study of Apical Versus Papillary Neochord Anchoring for Mitral Regurgitation", 2019, Ann Thorac Surg108:90-8.

(Continued)

*Primary Examiner* — Jeffrey S Vanderveen
(74) *Attorney, Agent, or Firm* — LUMEN PATENT FIRM

(57) ABSTRACT

Simulated motion of the papillary muscles in a heart simulator is provided that simulates natural motion of the papillary muscles. This improves heart valve simulation. This can be done with a six degree of freedom robotic actuator (e.g., a Stewart platform or the like) appropriately driven by a controller. This can also be done with a robotic actuator that provides constrained motion of its effector by including a mechanical linkage, as long as the resulting simulated papillary muscle motion includes time-varying position and orientation of the papillary muscle.

17 Claims, 8 Drawing Sheets

(56) References Cited

FOREIGN PATENT DOCUMENTS

| KR | 101742585 B1 | 6/2017 | | |
|----|----|----|----|----|
| WO | WO-2004030599 A2 | * | 4/2004 | ............ G09B 23/30 |
| WO | WO-2013116519 A1 | * | 8/2013 | ........... G09B 23/281 |
| WO | WO-2020047761 A1 | * | 3/2020 | |

OTHER PUBLICATIONS

Imbrie-Moore et al., "A novel 3D-Printed preferential posterior mitral annular dilation device delineates regurgitation onset threshold in an ex vivo heart simulator", 2020, Medical Engineering and Physics 77 10-18.

Woo et al., "Posterior ventricular anchoring neochordal repair of degenerative mitral regurgitation ef!ciently remodels and repositions posterior leaflet prolapse", 2013, European Journal of Cardio-Thoracic Surgery 44, 485-489.

Ni et al., "Assessment of the Rotation Motion at the Papillary Muscle Short-Axis Plane with Normal Subjects by Two-Dimensional Speckle Tracking Imaging: A Basic Clinical Study", 2013, PLOS ONE, v8n12, e83071.

Vismara et al., "A pulsatile simulator for the in vitro analysis of the mitral valve with tri-axial papillary muscle displacement", 2011, Int J Artif Organs, 34(4): 383-391.

Chu, "Engineers design bionic "heart" for testing prosthetic valves, other cardiac devices", 2020, MIT News.

Park et al., "An organosynthetic dynamic heart model with enhanced biomimicry guided by cardiac diffusion tensor imaging", 2020, Sci Robot. 5, eaay9106.

\* cited by examiner

ROBOTIC PLATFORMS TO MIMIC PAPILLARY MUSCLE MOTION EX VIVO

CROSS REFERENCE TO RELATED APPLICATIONS

This application claims priority from U.S. Provisional Patent Application 62/983,378 filed Feb. 28, 2020, which is incorporated herein by reference.

FIELD OF THE INVENTION

This invention relates to heart simulation.

BACKGROUND

Heart simulation is of interest for various applications ranging from basic science to testing patient-specific treatments. Accordingly, it is of considerable interest to provide higher fidelity heart simulation. However, this can be a complicated problem. For example, motion of leaflets of the mitral valve is controlled to an important degree by chordae which are attached to the heart wall via papillary muscles. Most heart simulation to date takes the papillary muscles to be stationary. However, papillary muscles move during the cardiac cycle.

Accordingly, it would be an advance in the art for heart simulation to include simulated motion of the papillary muscles, especially including both translation and rotation.

SUMMARY

In this work, simulated motion of the papillary muscles in a heart simulator is provided that simulates natural motion of the papillary muscles. This improves heart valve simulation. This can be done with a six degree of freedom robotic actuator (e.g., a Stewart platform or the like) appropriately driven by a controller. This can also be done with a robotic actuator that provides constrained motion of its effector by including a mechanical linkage, as long as the resulting simulated papillary muscle motion includes time-varying position and orientation of the papillary muscle.

The natural motion of the papillary muscles can be subject-specific (e.g., derived from imaging of the subject), or it can be a nominal motion (e.g., derived from a database of relevant examples of the subject). The example considered below relates to mitral valve simulation, but these principles also apply to tricuspid valve simulation, since that valve is also connected to the heart wall via chordae and papillary muscles.

DETAILED DESCRIPTION

Section A describes general principles relating to embodiments of the invention. Section B describes an experimental example.

A) GENERAL PRINCIPLES

Figure 1A:
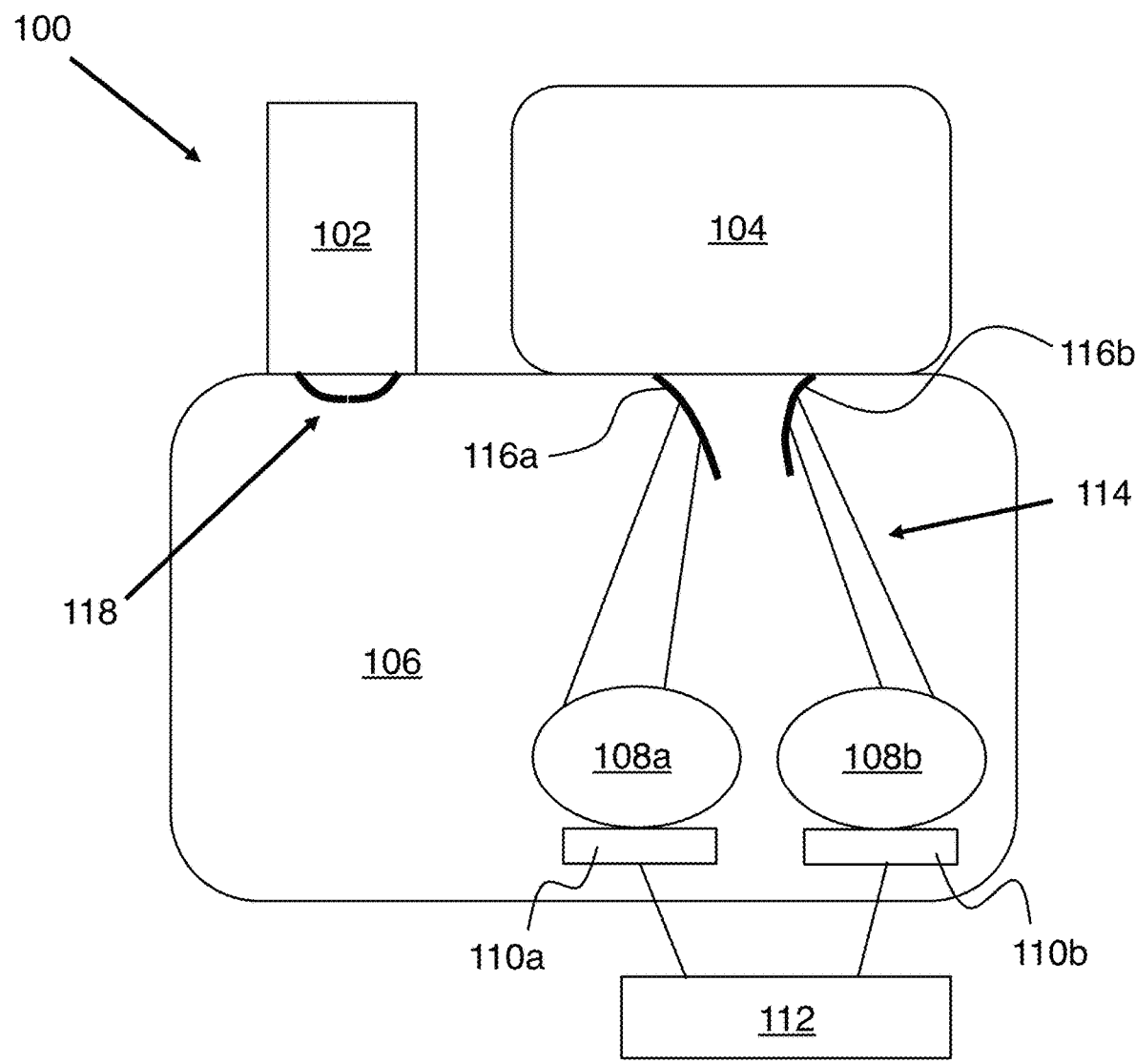
FIGS. 1A-B show an embodiment of the invention.
Figure 1B:
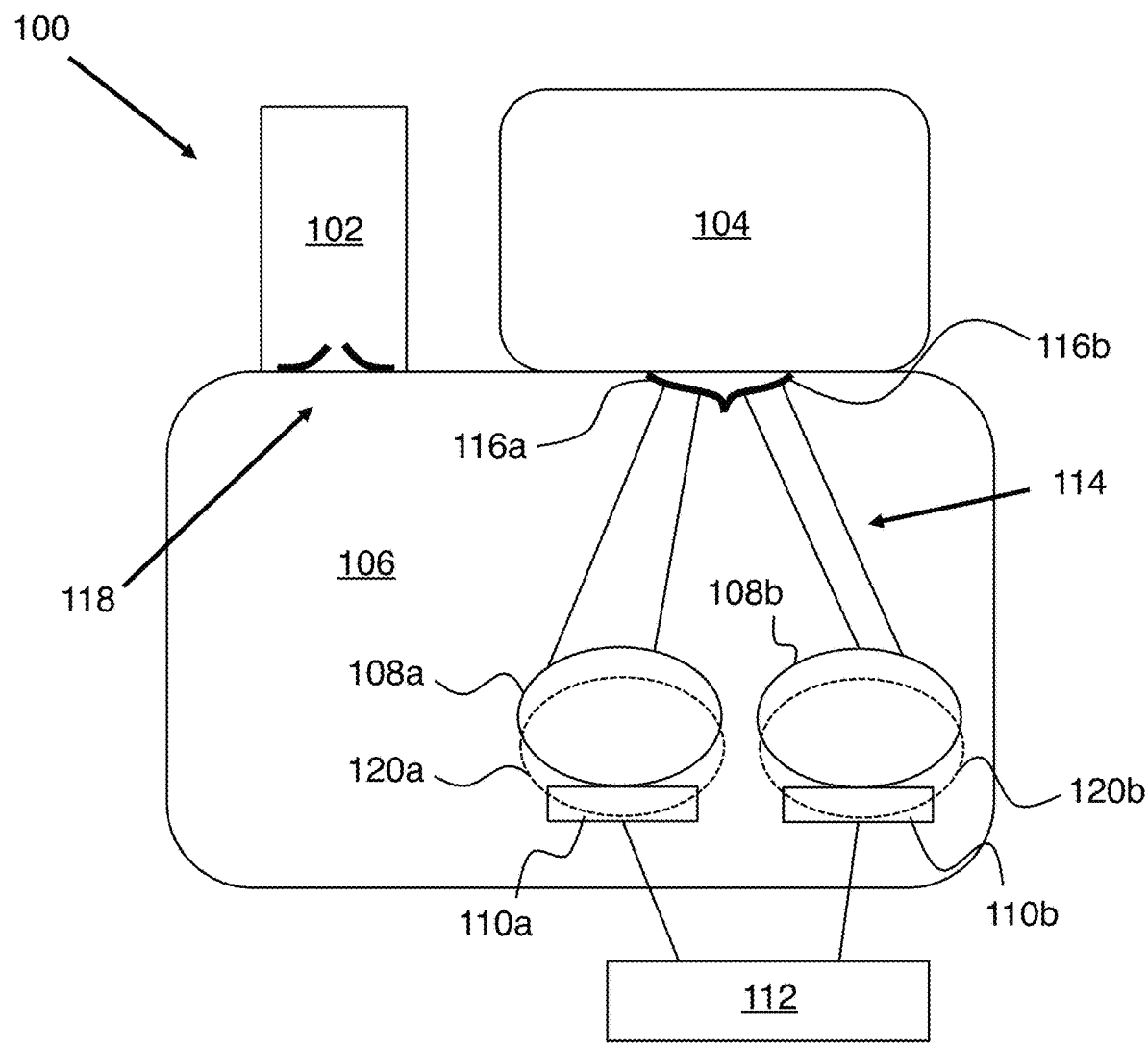

FIGS. 1A-B schematically show method and apparatus of a left heart simulator 100 according to principles of the invention. Here 102, 104 and 106 are aortic, atrial and ventricular chambers, respectively. A heart valve structure is disposed in the simulator, and includes papillary muscles 108a, 108b, chordae 114, and valve leaflets 116a and 116b. The papillary muscles 108a, 108b are affixed to robotic actuators 110a, 110b respectively.

The robotic actuators are driven by controller 112. The aortic valve, which can be a mechanical valve, is referenced as 118. FIG. 1A shows the situation when flow is from atrial chamber 104 to ventricular chamber 106 (diastole), and FIG. 1B shows the situation when flow is from ventricular chamber 106 to aortic chamber 102 (systole). In natural heart motion, the papillary muscles move during the cardiac cycle, as schematically shown on FIG. 1B by the difference in position of papillary muscles 108a, 108b vs. their diastole positions 120a and 120b (dashed lines). Naturally, real cardiac motion is much more complicated than the simple translation shown in these sketches. In particular, both rotation and translation are relevant.

Accordingly, an embodiment of the invention is a method including:

1) performing heart simulation with a heart simulator configured to provide mounting for at least one heart valve structure, where the heart valve structure includes one or more papillary muscles, and where the heart simulator includes one or more robotic actuators having three positional degrees of freedom and at least one rotational degree of freedom for motion;

2) affixing at least one of the papillary muscles of the heart valve structure to the one or more robotic actuators; and 3) driving the robotic actuators so as to simulate natural in vivo cardiac motion of the one or more papillary muscles.

Another embodiment of the invention is an apparatus including:

a heart simulator configured to provide mounting for at least one heart valve structure, where the heart valve structure includes one or more papillary muscles;

one or more robotic actuators having three positional degrees of freedom and at least one rotational degree of freedom for motion, where at least one of the papillary muscles of the heart valve structure is affixed to the one or more robotic actuators; and a controller configured to drive the robotic actuators so as to simulate natural in vivo cardiac motion of the one or more papillary muscles.

In either case, the robotic actuators can each include a base, an end-effector plate, and six rods connecting the base to the end-effector plate. The base can include six servo motors each connected to a corresponding one of the six rods with a servo arm member such that rotations of the servo motors control position and orientation of the end-effector plate (e.g., FIG. 2A).

Figure 6:
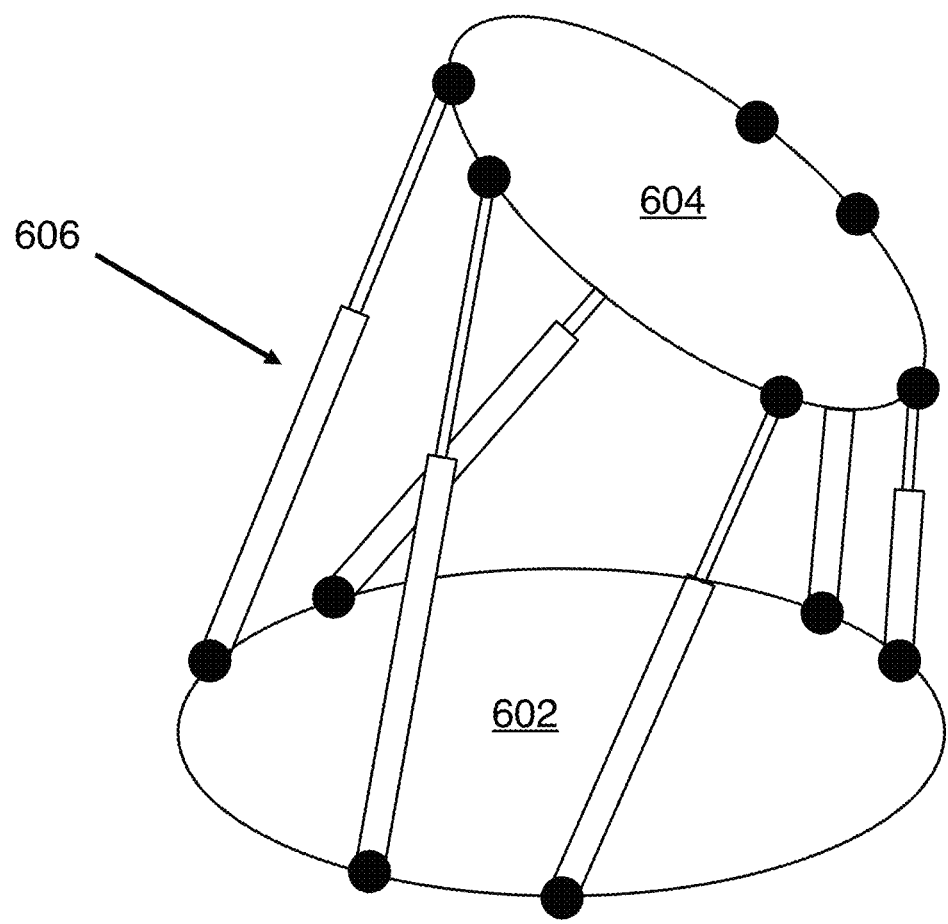
FIG. 6 shows an alternative to the actuator of FIG. 2A.

Alternatively, the robotic actuators can each include a base, an end-effector plate, and six rods connecting the base to the end-effector plate. Each rod can include a linear actuator such that length changes of the linear actuators control position and orientation of the end-effector plate. See FIG. 6 for an example, where 602 is the base, 604 is the end-effector plate, and 606 are the rods each including a linear actuator for changing its length. The black circles on FIG. 6 are spherical joints that permit relative rotation of the rods vs. the base and end-effector plates.

The heart valve structure is preferably a mitral valve structure. In this case, the heart valve structure includes two papillary muscles, and the one or more robotic actuators are two robotic actuators corresponding to the two papillary muscles.

The heart valve structure can be a natural heart valve structure. Alternatively, it can be an artificial heart valve structure. Thus heart simulation includes ex vivo simulation of natural heart valve structures and simulation of artificial heart valve structures.

The natural in vivo cardiac motion of the one or more papillary muscles can be subject-specific cardiac motion obtained by imaging a subject. Alternatively the natural in vivo cardiac motion of the one or more papillary muscles can be a nominal cardiac motion obtained from a database of imaging records. A subject can be a human patient or an experimental animal.

Figure 7:
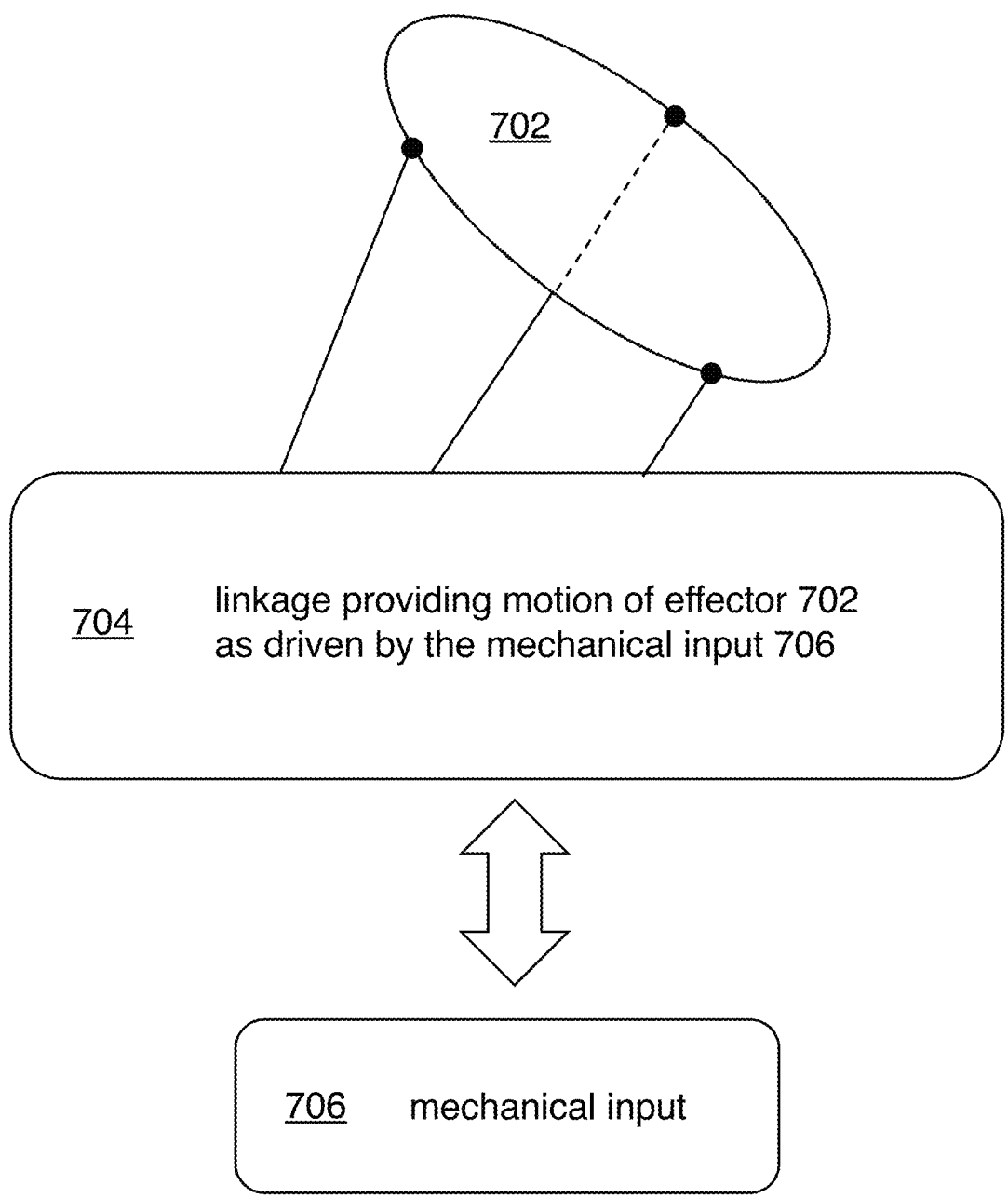
FIG. 7 schematically shows a linkage to relate motion from a mechanical input to motion of an effector.

FIG. 7 shows an alternative conceptual approach for describing robotic actuation suitable for simulating heart motion. Here 702 is an end-effector, 706 is a mechanical input (e.g. from a motor or linear actuator), and 704 is a mechanical linkage that relates motion of end-effector 702 to the mechanical input 706. Thus in the preceding example, the six rods of the modified Stewart platform can be regarded as the mechanical linkage, and the mechanical input would then be the motors combined with the servo arm members. If the mechanical linkage is taken to be the rods of the Stewart platform in combination with the servo arms, then the mechanical input is just the motors. So there is some flexibility in how the dividing line between the linkage and the mechanical input is drawn.

What this point of view makes more clear is that there are cases where the motion of end-effector 702 doesn't have six degree of freedom. It can have 1-5 degrees of freedom, depending on details of the mechanical linkage and mechanical inputs used. It is anticipated that such restriction of the degrees of freedom is still consistent with providing high fidelity heart valve simulation as described above, as long as the resulting configuration has the ability to provide a time varying position and orientation of the papillary muscles during simulated heart cycling. It is also noted that design of such mechanical linkages is well known to workers in the art.

Accordingly, another embodiment of the invention is apparatus including:

1) an ex vivo heart simulator configured to provide mounting for at least one heart valve structure, where the heart valve structure includes one or more papillary muscles;
2) one or more robotic actuators, where at least one of the papillary muscles of the heart valve structure is affixed to the one or more robotic actuators, and where each of the robotic actuators includes a mechanical linkage relating motion of an end-effector to motion provided by a mechanical input;
3) a controller configured to drive the one or more mechanical inputs of the one or more robotic actuators to provide simulated motion of the one or more papillary muscles.

Here the simulated motion simulates natural in vivo cardiac motion of the one or more papillary muscles, and includes time-varying position and orientation of the one or more papillary muscles.

B) EXPERIMENTAL EXAMPLE

B1) Introduction

Ex vivo heart simulators provide an important platform to drive innovation in cardiac surgery. These simulators are used to design and analyze surgical techniques and devices for optimized implementation in human patients. The simulators feature programmable pumps that expose heart valves to their physiologic environment—including relevant pressure and flow waveforms—while hemodynamic, strain, and motion metrics are recorded. Numerous previous studies feature analyses of disease states and optimization of surgical valve repair techniques and devices. These studies are unique in their ability to immediately inform the current practice of cardiac surgery and have already had a meaningful impact on patient care through the analysis of surgical repairs. However, the fidelity of these biomechanics analyses and surgical optimizations is dependent on the ability of the simulator to accurately mimic the in vivo environment, particularly for patient-specific surgical optimization.

A significant limitation of current mitral valve ex vivo simulation is the inability to include the complex motion of the papillary muscles. In vivo, the papillary muscles move with each heartbeat, translating and rotating relative to the valve annulus, which in turn crucially affects the motion and forces on the chordae tendineae and the leaflets, and thus the function of the valve. This complex papillary muscle motion will not only have an impact on the analysis of healthy valve mechanics ex vivo, but it will also play an important role in generating mitral valve disease models due to altered papillary muscle motion. In particular, secondary mitral regurgitation is typically a result of ventricular processes affecting the cardiac trajectories of the papillary muscles and annulus. Including this motion in ex vivo simulation will significantly improve our ability to capture the full dynamics of the mitral valve and increase the reliability of our surgical repair analyses and optimizations. Though previous studies report the capability of adjusting papillary muscle placement within the simulator, the papillary muscles remain fixed in place during cardiac cycles. The use of robotics to simulate or augment natural cardiac movement has been implemented for a range of applications including motion compensation during surgery and implantable soft robotic devices to assist ventricular contraction. Recently, there have been developments in the use of soft robotics to simulate gross cardiac wall motion ex vivo, though the complex and unique motion of papillary muscles for valvular simulation and analysis has not yet been tackled. Here, we present the design and implementation of a dual image-guided papillary muscle (IPM) robotic system, including coupled waterproofed six-axis robotic platforms that mimic the native motion of the papillary muscles during ex vivo simulation. The effect of simulating papillary muscle motion can not only provide insight into the biomechanics of the mitral valve but also has important implications for all ex vivo mitral valve studies and surgical valve repair.

B2) Materials and Methods

B2.1) Image-Guided Papillary Muscle (IPM) Robot Design

Figure 2A:
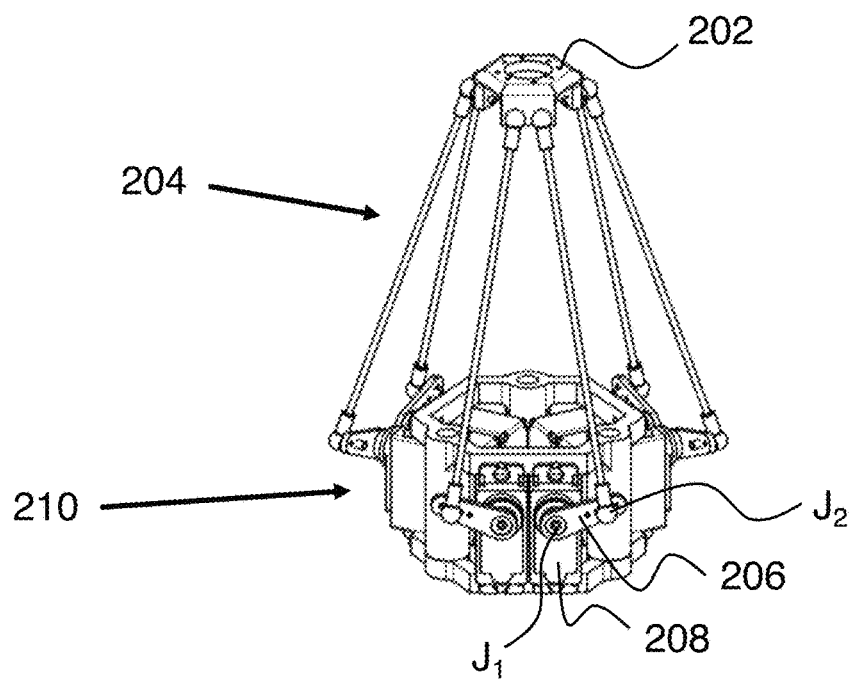
FIGS. 2A-B show robotic actuators that were used in the experimental work of section B.

Each IPM robot uses a modified Stewart platform design including six servo motors with actuating rods that extend to an end-effector platform with preformed suture perforations for papillary muscle attachment, as shown on FIG. 2A.

Here end-effector platform 202 is connected to the base 210 via six rods 204. The rods are driven by servo motors (one of which is referenced as 208 on FIG. 2A) via servo arm members (one of which is referenced as 206 on FIG. 2A). Here $J_1$ denotes the first joint at the base of the servo arm member and $J_2$ denotes the second joint connecting the servo arm member to the rod.

Figure 2B:
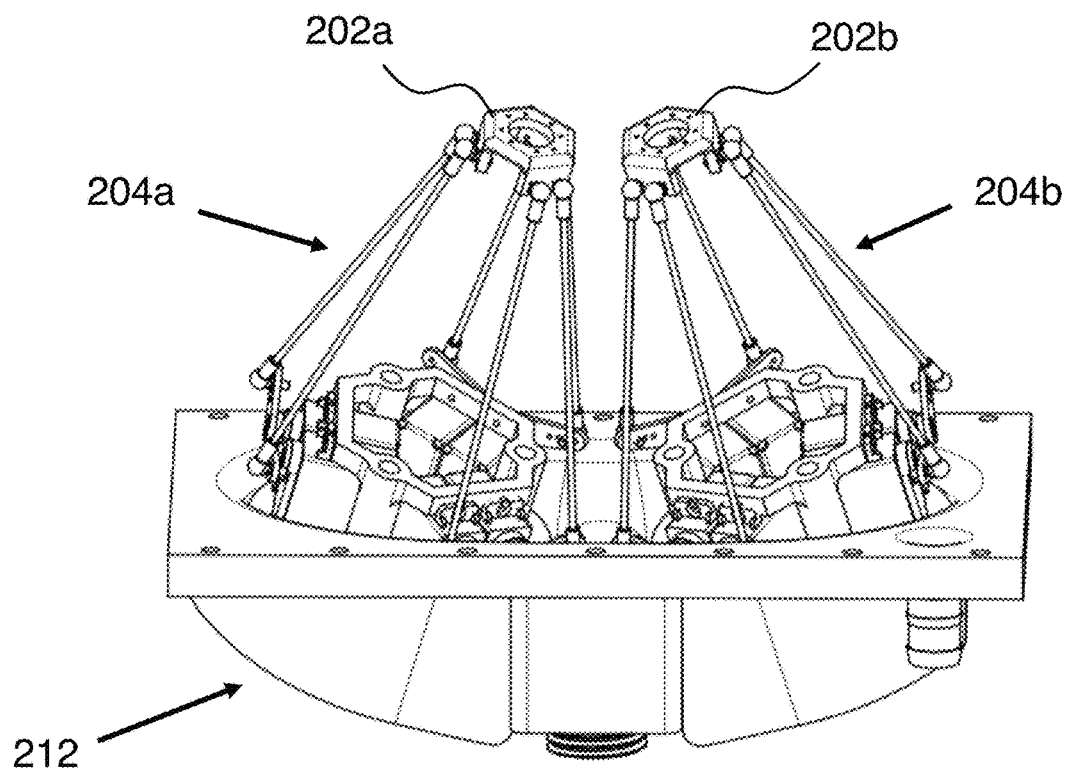

Using servo motors, as opposed to the more typical linear actuators, allows us to reduce the response time of our system, enabling a higher system bandwidth. Because this mechanism provides three translational and three rotational degrees of freedom, any position and orientation within the reachable system workspace can be uniquely specified by a combination of servo joint angles. Thus, with two IPM robots, we can fully mimic the complex native motion of each papillary muscle for both position and orientation axes to drive both papillary muscles within a heart simulator. The IPM robot was specifically designed to match the anatomical geometry of the animal model and the geometric constraints of our left heart simulator. Each IPM robot was constructed using a custom 3D-printed housing for the six waterproofed servo motors. Carbon's MPU100 (Carbon, Redwood City, Calif.) was used as the material for all 3D-printed components, though each component could also be machined from a corrosion resistant metal to prevent deformation over a longer period of time. A modified heart simulator left ventricular chamber was built to mount the IPM robots, allowing for additional operating space without collisions between the legs or servo arms (FIG. 2B). On FIG. 2B, 212 is a base configured to hold two actuators as on FIG. 2A, having end-effector platforms 202a and 202b and having rods 204a and 204b, in an appropriate overall configuration.

To drive the coupled IPM robots, we designed a custom software package that both calculates the kinematics of our system to drive the servo motors and graphically simulates the state of the system in real time. Due to the high number of degrees of freedom of each IPM robot and the use of revolute joints as opposed to linear actuators, controlling the highly nonlinear kinematics of the platform presents several mathematical challenges. The forward kinematics of this system, which would allow for the calculation of end-effector positions from joint angles, presents a highly complex, nonlinear system of equations typically requiring iterative approaches to solve. However, the inverse kinematics, which allows us to calculate joint angles from given end-effector positions, is a less computationally expensive problem and can be applied to calculate joint angles in real time. Additionally, to inform the design of such a system, we performed both singularity and computational operating space analyses during our iterative design approach, described below. A simple position validation test was also performed to examine the approximate accuracy of the IPM motion.

B2.2) Singularity Analysis

The IPM robot is a modified and miniaturized form of a Stewart platform. A Stewart platform could become theoretically uncontrollable due to a singularity; we determined the conditions for this singularity and formulated our design geometry to avoid it. We have shown that when the base and end-effector are similar and highly symmetric in a linear-actuator Stewart platform, such a singularity occurs. Thus, we chose not to use an end-effector and base that are semiregular hexagons with the same relative proportions. Instead, we used semiregular hexagons that were dissimilar. The selected end-effector side lengths were 0.95 cm and 1.9 cm, while the base lengths were 1.6 cm, 7.4 cm. Hence the two hexagons have unequal side length ratios $$\frac{1.9}{0.95} = 2$$

and $$\frac{7.4}{1.6} = 4.6.$$

We also computationally verified that these parameters allow significant variation away from the hypersurface defining the singularity. Additionally, we did not use linear actuators; on FIG. 2A controlling joint $J_2$ would be equivalent to a linear actuator, but we instead controlled joint $J_1$.

B2.3) Computational Operating Workspace Validation

To calculate the workspace of our IPM robot and ensure the papillary muscle motion falls within these limits, we used a supercomputing cluster to perform a computational analysis of our defined system and unique geometric constraints. Using the inverse kinematics of our system to verify whether a position and orientation was physically reachable by the platform, we iterated over a six-dimensional boundary set to determine the geometry of the system workspace. The computing cluster used represents a 192-fold computational enhancement over a standard computer (2 GHz, quad-core Intel i5) allowing us to iterate over $1.4 \times 10^{10}$ unique positions and orientations using 384 computing cores.

B2.4) Papillary Muscle Trajectory Translation

To determine the physiologic motion of the papillary muscles, the mitral valve annulus and papillary muscles were tracked using CEMRG software (London, UK) for a de-identified dataset of high-resolution computed tomography (CT) scans of an adult human heart with 10 images over the course of one cardiac cycle. In the left heart simulator, the annulus is sewn to a flexible mount that allows it to passively undergo a conformational change between a saddle shape and a flat ring during the cardiac cycle to approximate the natural annulus motion while its center remains fixed. However, in vivo, the annulus centroid also translates as the heart beats. Thus, the papillary muscle trajectories were adjusted to compensate for this native annulus translation. Additionally, using a series of rotation matrices calculated in MATLAB (Mathworks, Natick, Mass.) that match the geometry of our physical system, these trajectories were transformed to superimpose motion of the cardiac cycle from CT images onto our physical IPM robot end-effectors.

Using a series of rotation matrices along with our robot-controlled system, this tracked CT data allowed us to mimic the exact positions and orientations of the native papillary muscle cardiac trajectory with our IPM robot. The centroid of the three points prescribing the motion of each papillary muscle defined the position of the end-effector, while the plane that contained all three points defined the orientation of the end-effector. However, in order to interpret this orientation plane of the points as a control parameter, we additionally calculated the Euler body angles of the three points. This was done by calculating the plane's orthogonal vector and then performing arctangent operations to find the body angles. After transforming these points to match our system geometry and calculating their positions and orientations, we inputted these trajectories into our software platform which calculated the appropriate joint angles for each servo motor of the IPM robot.

B2.5) Left Heart Simulator

To test the impact of this motion on the mitral valve apparatus, we recorded the forces on the chordae tendineae of a mitral valve in real time, comparing the forces when the IPM robots were synchronized to mimic native motion versus a stationary state to match the current state of the art in ex vivo simulation. Ex vivo simulation typically uses porcine mitral valves as a human analogue. In this study, mitral valves were carefully excised from locally obtained fresh porcine hearts, preserving the annulus, leaflets, papillary muscles, and chordae tendineae; in select circumstances, a valve could not be tested on the day of explantation and was placed in vacuum-sealed bag with normal saline and frozen for preservation. To mount the valve within our custom left heart simulator, a small cuff of left atrium was also preserved as the attachment for a 3D-printed, elastomeric, silicone sewing ring fixed between the left atrial and left ventricular simulator chambers. The sewing ring material provided elasticity to reduce annulus fixation and the left atrial cuff aided in retaining the natural elasticity of the valve. The valve was mounted to the sewing ring with six interrupted 2-0 braided polyester sutures for alignment as well as a continuous running 2-0 polypropylene suture as a hemostatic suture line. The hemostatic line was locked to prevent inadvertent restrictive annuloplasty. Due to the importance of consistency in fixing the IPM robots to the valve, hearts with aberrant papillary muscle anatomy were excluded. Each papillary muscle was sewn to a 3D-printed end-effector platform using four interrupted, pledgeted, 2-0 braided polyester horizontal mattress sutures. The papillary muscles were cut prior to mounting such that each would be properly positioned on the end-effectors in a native configuration when the IPM robot was at its origin, thus providing the maximum range of reachable space. Each end-effector's position was then further refined to mimic in vivo placement inside the left heart simulator using the IPM robot's six degrees of freedom. The in vivo papillary muscle trajectory was then superimposed onto this native home position.

Figure 3:
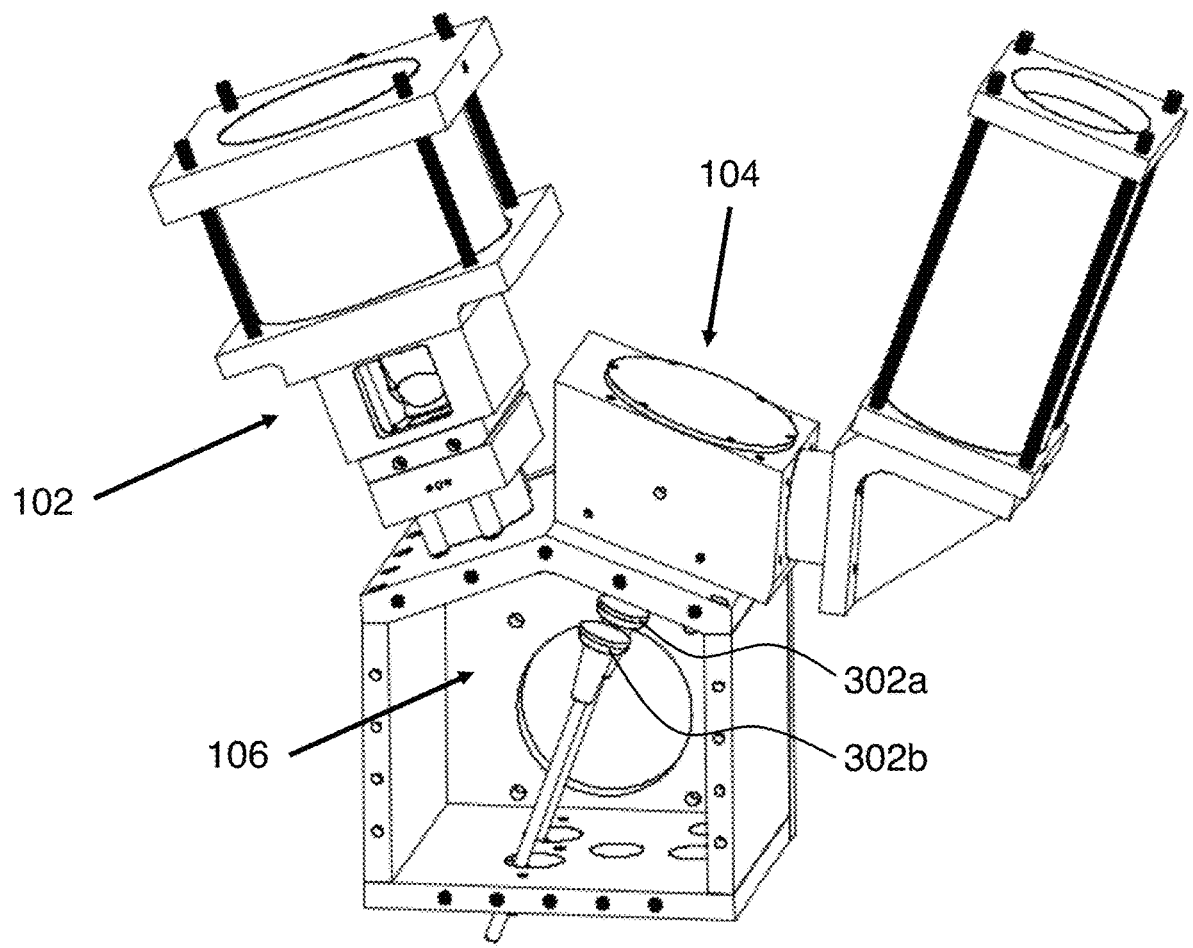
FIG. 3 is a simplified view of the heart simulator of the experimental work of section B.

The design of our custom left heart simulator has been previously described. FIG. 3 schematically shows the main components of this left heart simulator. Here 102, 104 and 106 are aortic, atrial and ventricular chambers as described above, and 302a, 302b schematically show the locations of the end-effectors of the IPM robots as described above. The simulator features a pulsatile linear piston pump (ViVitro Superpump, ViVitro Labs, Victoria, BC, Canada) programmed to produce a physiologic waveform in compliance with ISO 5840 standards for in vitro valve testing. Pressure was recorded using ventricular, aortic, and left atrial pressure transducers (Utah Medical Products Inc., Midvale, Utah), while flow was recorded using electromagnetic flow probes (Carolina Medical Electronics, East Bend, N.C.). To ensure proper transduction of the flow meters, 0.9% normal saline was used as the test fluid. Peripheral resistance and compliance in the system were initially titrated with a 70 28-mm leakless disc valve (ViVitro). During testing, the mechanical mitral valve was replaced by a porcine valve with both papillary muscles fixed to the IPM robots, and 10 cycles of hemodynamic data were collected in both stationary and robotic motion states. A synchronizing signal pulse from the linear piston pump controller was used to drive the timing of the IPM robot motion.

Forces on the chordae tendineae were measured with calibrated fiber Bragg grating (FBG) strain gauge sensors (DTG-LBL-1550 125 μm FBGS International, Belgium) as previously described. FBGs are optical strain gauges with a thin profile and low mass, enabling the use of the sensors on multiple chordae without disrupting the hemodynamics and mechanics of the valve apparatus. The sensors were fixed to native chordae using CV-6 PTFE flanking the 4 mm strain gauge with care taken to ensure the length of chord between the two sutures matched the 4 mm length of the strain gauge. The section of chordae between the sutures was then cut with no change in overall chordal length to direct the entire force to the FBG sensor.

Figure 4:
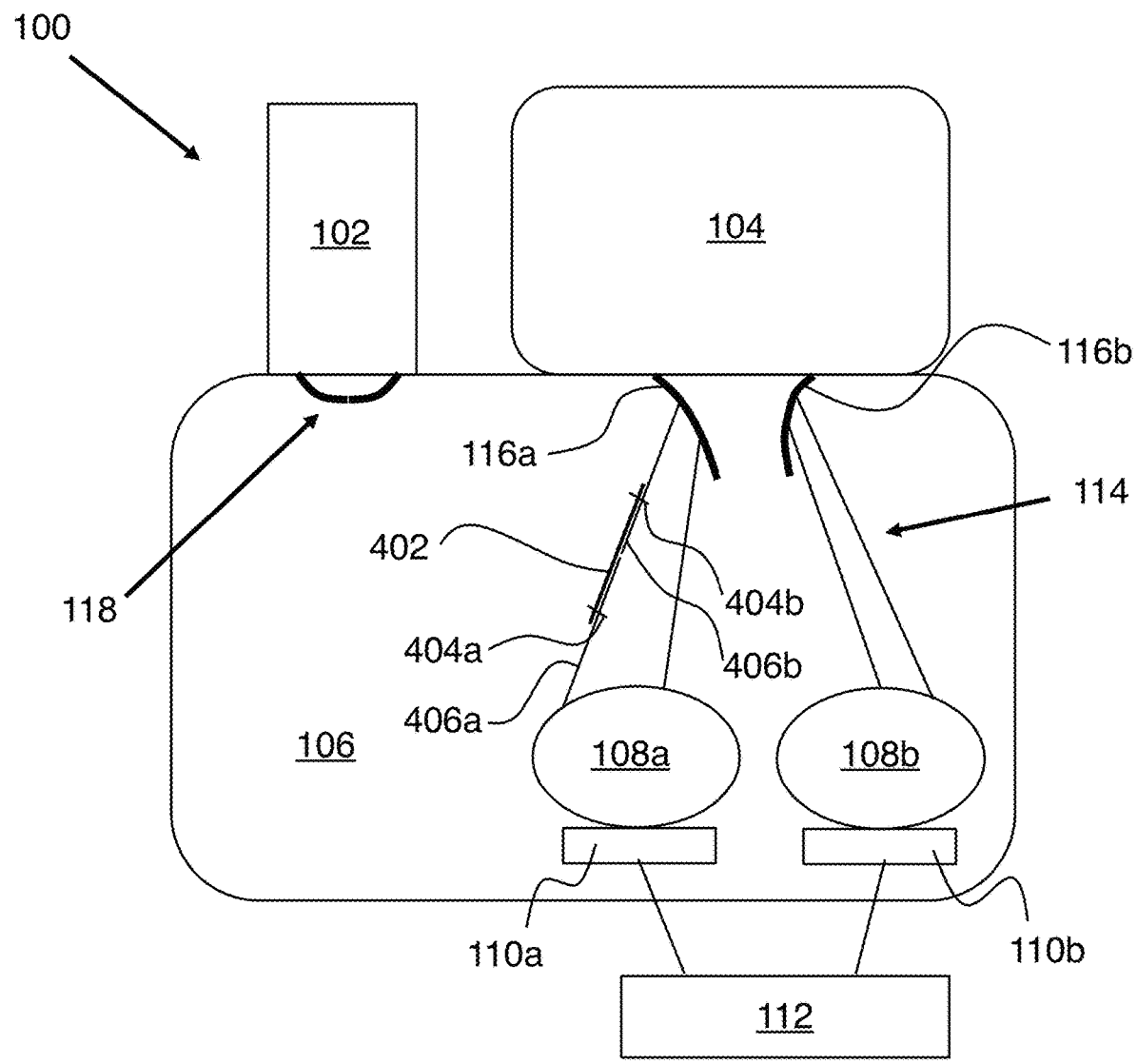
FIG. 4 schematically shows use of a fiber Bragg grating force sensor for measuring chordae forces in situ during the cardiac cycle.

FIG. 4 schematically shows this, where an FBG sensor 402 is affixed to a chordae with sutures 404a, 404b. Cutting the chordae so that chordae 406a is connected to chordae 406b only via FBG sensor 402 (as shown) provides in situ force sensing as described.

Multiple native chordae (n=3-5) were instrumented for each valve, including primary and secondary chordae in both posterior and anterior positions. Each chord is unique in its geometry, anatomical placement, and cross-sectional area, and thus there will be native force differences between each chord. To ensure a paired comparison for each chord, no adjustments to FBG instrumentation were made between exposing the valve to the stationary and papillary muscle motion conditions. Maximum chordal forces were calculated as well as the rate of change of force with respect to time $$\left(\frac{dF}{dt}\right)$$

at the onset of systole.

B2.6) Statistical Analysis

Statistical significance was defined at $P<0.05$ for all tests. Chordal force and rate of change of force variables are reported as mean±standard deviation. Non-parametric Friedman tests were used to compare continuous chordal force and rates of change of force variables between stationary and motion groups. This test accounts for non-normally distributed forces and for the fact that the experimental method included separate data collection stages for each valve. Maximum chordal forces were calculated as the average force during systole, and $$\frac{dF}{dt}$$

was calculated as the average rate of change of force on a given chordae tendineae with respect to time at the onset of systole.

B3) Results

B3.1) Computational Operating Workspace Simulation

Because this system has six degrees of freedom, in order to conduct a full workspace analysis, we iterated over six dimensions. We additionally performed a three-dimensional iteration for intuitive visualization. For the three-dimensional iteration, we kept a constant, neutral orientation, absent of any rotation and mapped the end-effector centroid. This precise but less accurate set gave a general approximation of the true workspace with a superior resolution (0.11 mm), allowing us to more intuitively visualize the space. The six-dimensional iteration (i.e. accounting for both position and orientation of the end-effector) was more computationally expensive, leading to a lower resolution set (3.33 mm and) 3.75°, but provided a more accurate approximation of the real workspace.

Calculated workspace limits are shown in Table 1. These results confirmed that the IPM robot workspace for our system encompassed the limits of the human papillary muscle trajectory used in this study.

TABLE 1

Computing cluster simulated workspace ranges for the IPM robot end-effector.

|  | X Axis Range (cm) | Y Axis Range (cm) | Z Axis Range (cm) |
| --- | --- | --- | --- |
| Three Dimensions | [−5.0136, 5.0136] | [−5.2539, 5.7891] | [−1.7476, 1.8023] |
| Six Dimensions | [−6.6667, 6.6667] | [−6.3333, 7.6667] | [−4, 1.6667] |

B3.2) Implementation in the Heart Simulator

Three porcine valves were tested in our custom left heart simulator and successfully affixed to the final dual IPM robotic system (FIGS. 2B-3). Multiple chordae tendineae were instrumented with high-resolution FBG strain gauge sensors for a total of 10 chordae instrumented across the valves (FIG. 4). The left heart simulator subjected each valve to physiologic pressures and flows, while the IPM robots were synchronized to simulate in vivo papillary muscle motion.

Figure 5A:
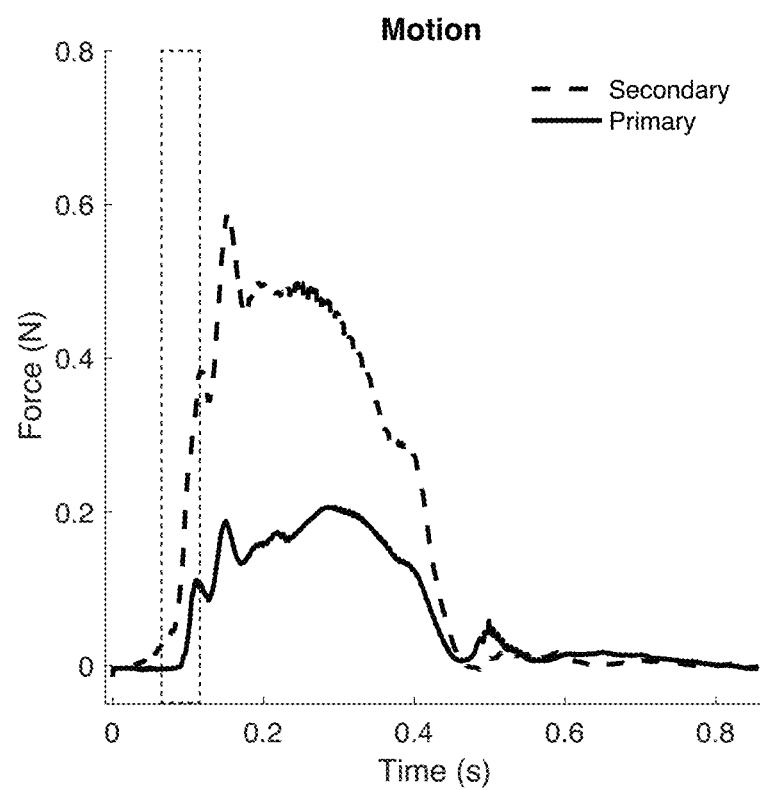
FIGS. 5A-B shows chordae force measurement results with and without simulated motion of papillary muscles in the heart simulator.
Figure 5B:
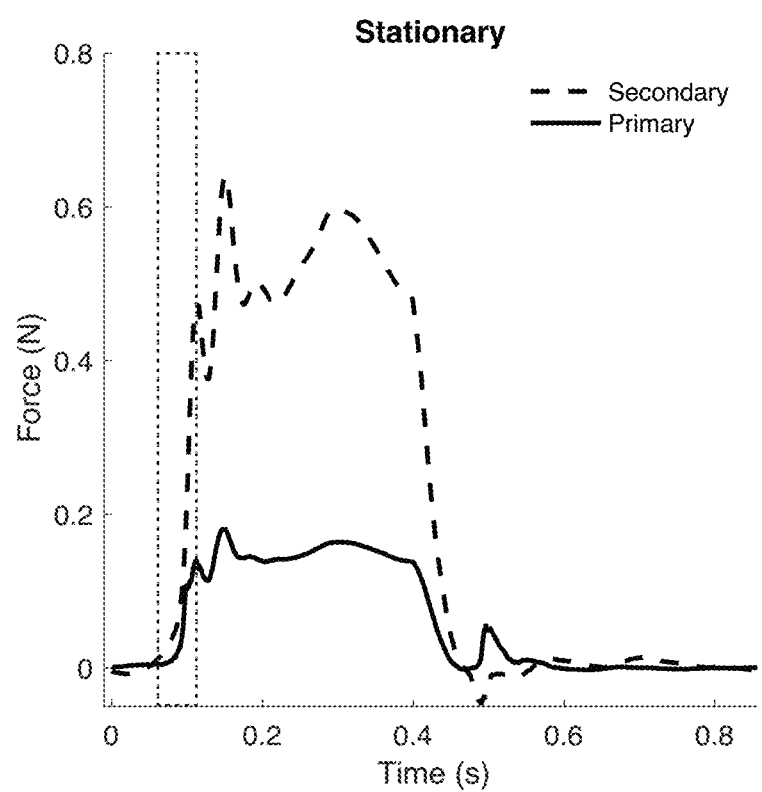

No significant difference was found for any hemodynamic parameters between the stationary and robotic actuated motion states tested, including mean arterial pressure, diastolic pressure, systolic pressure, mean atrial pressure, mean ventricular pressure, and regurgitant fraction. However, a clear difference was observed when analyzing the force profiles. FIG. 5A shows the forces in the robotic state with primary and secondary chordae separated and FIG. 5B shows the forces in the stationary state. In both cases, the force tracings are averaged across at least four cardiac cycles to produce an average cardiac cycle tracing; variability cycle to cycle was extremely low with a standard deviation of less than 0.01 N in peak forces across cycles. Qualitatively, the smoother force profile of the chordae with the coupled IPM robots driving the papillary muscles to mimic their natural motion is far more similar to previously reported in vivo force results. We can examine this force tracing difference quantitatively through an analysis of the yank on the chordae, a term denoting the rate of change of force over time $$\left(\frac{dF}{dt}\right).$$

The onset or systole (dashed rectangles on FIGS. 5A-B) was selected as the region for the rate of change of force analysis because this region of the chordal force profile experiences a dramatic spike in force with maximum $$\frac{dF}{dt}$$

as the valve is first subjected to the rising left ventricular pressure. Note that FIGS. 5A-B show the composite tracing across multiple chordae and valves; due to the fact that each valve has a unique anatomical geometry which causes slight offsets in the force profiles, the onset of systole region was defined individually for each case.

$$\frac{dF}{dt}$$

at the onset or systole was significantly lower for the robotic motion state compared with the stationary state in both primary chordae $$3.14 \; \frac{N}{s}$$

versus $$5.33 \; \frac{N}{s},$$

P=0.046) and secondary chordae $$5.13 \; \frac{N}{s}$$

versus $$13.16 \; \frac{N}{s},$$

P=0.025). A lower $$\frac{dF}{dt}$$

is an indicator that the force on the chordae rises more smoothly; note that no significant difference was found between the maximum force measured on the chordae for either primary or secondary chordae tendineae between the stationary and robotic actuated states.

B4) Discussion

Ex vivo cardiac simulation provides a robust means to quantitatively analyze cardiac biomechanics and offers a platform to optimize surgical techniques. Thus, each step advancing this simulation to more closely match the in vivo environment significantly improves our ability to design optimal devices and surgical techniques. This work presents a coupled six-axis robotic Stewart platform system that mimics the native motion of papillary muscles for an important advancement in ex vivo simulation. The system was designed with six degrees of freedom to capture the complex translation and rotation in native papillary muscle motion, prescribed by high-resolution CT images. We also conducted thorough mathematical and supercomputer-enabled numerical analyses to ensure our system geometry avoided singularity conditions and operated within our physical boundary requirements. From our computational simulation results, we found that our physical system has a larger relative reachable area across the XY-plane, while being most limited in the Z-direction. Intuitively, this matches the description of this kind of parallel manipulator, as the Z-direction workspace is approximately limited to twice the length of the servo horn. This analysis proved invaluable for informing our design as it allowed us to fine-tune the physical geometry of our system to better match the workspace of the papillary muscle trajectory to our IPM robot workspace.

Ultimately, the IPM robots mounted in our ex vivo left heart simulator enabled high-resolution analysis of hemodynamics and chordal force profiles with the simulation of in vivo papillary muscle motion. In particular, the introduction of papillary muscle motion, when compared with the traditional stationary ex vivo testing configuration, resulted in a $$\frac{dF}{dt}$$

at the onset or systole that was significantly lower for both primary and secondary chordae. A lower $$\frac{dF}{dt}$$

in the robotic actuated state indicated that the papillary muscle motion likely acts to cushion the sharp increase in force on the chordae at the onset of systole. The lack of significant difference in peak force was expected given that we ensured that the position of the papillary muscles in the stationary mode was in accordance with the papillary muscle in vivo systolic position; thus, in both stationary and papillary muscle motion modes, the valve would be in similar configurations during systole when the left ventricular pressure is highest, and therefore seeing similar maximum force levels. However, it is possible that the sharp spike in force at the onset of systole would be slightly attenuated with the cushioning effect of papillary muscle motion. With increased testing and additional valves, we may be able to elucidate if this attenuation exists and, if so, to what extent. The recorded forces were slightly lower than expected given previous ex vivo data. This is likely due to instrumenting chordae tendineae prior to the tests when they are not under physiologic tension, thus resulting in a slight mismatch in effective chordae and strain gauge length. In future experiments, the end-effectors can be lowered to induce proper tensioning while the strain gauge instrumentation is performed.

Though this IPM robotic system brings us closer to a more representative ex vivo cardiac simulation, there are limitations. There is a potential mismatch between the valve being tested and the papillary muscle trajectory selected for the IPM robots to simulate. Only in the very specific case where the valve motion was measured in vivo prior to ex vivo experimentation would this mismatch be eliminated. With a future large animal experiment, the importance of this valve-specific trajectory could be determined. In vivo forces could be measured in a porcine or ovine model while CT or magnetic resonance images are recorded, then the valve could be explanted and tested in the heart simulator with the IPM robots mimicking the exact in vivo motion. Additionally, although no significant hemodynamic differences were observed, we propose a more in-depth analysis of coaptation area and tenting height in future studies to further elucidate any changes in valvular biomechanics with the introduction of papillary muscle motion.

There are also future areas of refinement for ex vivo cardiac simulation; one such area that could represent the next significant step towards a fully accurate simulator is the motion of the mitral valve annulus. Though our elastic valve sewing ring provided the flexibility to passively undergo conformational changes over the course of a cycle, the exact annular motion has yet to be prescribed in a simulator. Another area of improvement lies in the FBG sensors. Though the sensors represent an advancement over alternative strain gauges used to measure forces on chordae which have a larger footprint and mass, there will nonetheless be a mismatch in the stiffness of the FBG sensor in comparison with the native chordae. In manufacturing increasingly shorter FBGs, we have sought to mitigate this source of error by replacing only a fraction of the chord and thus retaining the overall viscoelastic properties. Future work to continue to shorten the sensor and to manufacture sensors using polymer-based fibers rather than silica-based fibers could refine the force-sensing measurement system further.

We showed that including the papillary muscle motion in these simulations significantly impacts the chordal force profile, and thus our novel image-guided papillary muscle robotic system can be used in future ex vivo experimentation to more accurately replicate the in vivo environment. With our IPM robots, new minimally invasive devices that place artificial chordae in regurgitant mitral valves can be analyzed in future studies incorporating the full motion of the papillary muscles, thus more accurately simulate the in vivo forces on both the native and artificial chordae. Moreover, with this advancement, we can study the biomechanics of chordal tethering from ventricular dilatation induced papillary muscle displacement on functional mitral regurgitation as well as papillary muscle head optimization through the use of high-resolution CT data from patients with cardiac disease.

The invention claimed is:

1. A method comprising:
    performing heart simulation with a heart simulator configured to provide mounting for at least one heart valve structure;
    wherein the heart valve structure includes one or more papillary muscles;
    wherein the heart simulator includes one or more robotic actuators having three positional degrees of freedom and at least one rotational degree of freedom for motion;
    affixing at least one of the papillary muscles of the heart valve structure to the one or more robotic actuators; and
    driving the robotic actuators so as to simulate natural in vivo cardiac motion of the one or more papillary muscles.

2. The method of claim 1, wherein at least one of the robotic actuators includes:
    a base;
    an end-effector plate; and
    six rods connecting the base to the end-effector plate;
    wherein each rod includes a linear actuator such that length changes of the linear actuators control position and orientation of the end-effector plate.

3. The method of claim 1, wherein at least one of the robotic actuators includes:
    a base;
    an end-effector plate; and
    six rods connecting the base to the end-effector plate;

wherein the base includes six servo motors each connected to a corresponding one of the six rods with a servo arm member such that rotations of the servo motors control position and orientation of the end-effector plate.

4. The method of claim 1, wherein the heart valve structure is a mitral valve structure.

5. The method of claim 4, wherein the heart valve structure includes two papillary muscles, and wherein the one or more robotic actuators are two robotic actuators corresponding to the two papillary muscles.

6. The method of claim 1, wherein the heart valve structure is a natural heart valve structure.

7. The method of claim 1, wherein the natural in vivo cardiac motion of the one or more papillary muscles is subject-specific cardiac motion obtained by imaging a subject.

8. The method of claim 1, wherein the natural in vivo cardiac motion of the one or more papillary muscles is a nominal cardiac motion obtained from a database of imaging records.

9. Apparatus comprising:
- a heart simulator configured to provide mounting for at least one heart valve structure, wherein the heart valve structure includes one or more papillary muscles;
- one or more robotic actuators having three positional degrees of freedom and at least one rotational degree of freedom for motion, wherein at least one of the papillary muscles of the heart valve structure is affixed to the one or more robotic actuators; and
- a controller configured to drive the robotic actuators so as to simulate natural in vivo cardiac motion of the one or more papillary muscles.

10. The apparatus of claim 9, wherein at least one of the robotic actuators includes:
- a base;
- an end-effector plate; and
- six rods connecting the base to the end-effector plate;
- wherein each rod includes a linear actuator such that length changes of the linear actuators control position and orientation of the end-effector plate.

11. The apparatus of claim 9, wherein at least one of the robotic actuators includes:
- a base;
- an end-effector plate; and
- six rods connecting the base to the end-effector plate;
- wherein the base includes six servo motors each connected to a corresponding one of the six rods with a servo arm member such that rotations of the servo motors control position and orientation of the end-effector plate.

12. The apparatus of claim 9, wherein the heart valve structure is a mitral valve structure.

13. The apparatus of claim 12, wherein the heart valve structure includes two papillary muscles, and wherein the one or more robotic actuators are two robotic actuators corresponding to the two papillary muscles.

14. The apparatus of claim 9, wherein the heart valve structure is a natural heart valve structure.

15. The apparatus of claim 9, wherein the natural in vivo cardiac motion of the one or more papillary muscles is subject-specific cardiac motion obtained by imaging a subject.

16. The apparatus of claim 9, wherein the natural in vivo cardiac motion of the one or more papillary muscles is a nominal cardiac motion obtained from a database of imaging records.

17. Apparatus comprising:
- an ex vivo heart simulator configured to provide mounting for at least one heart valve structure, wherein the heart valve structure includes one or more papillary muscles; and
- one or more robotic actuators, wherein at least one of the papillary muscles of the heart valve structure is affixed to the one or more robotic actuators;
- wherein each of the robotic actuators includes a mechanical linkage relating motion of an end-effector to motion provided by a mechanical input;
- a controller configured to drive the one or more mechanical inputs of the one or more robotic actuators to provide simulated motion of the one or more papillary muscles;
- wherein the simulated motion simulates natural in vivo cardiac motion of the one or more papillary muscles;
- wherein the simulated motion includes time-varying position and orientation of the one or more papillary muscles.

* * * * *